United States Patent [19]

Arman

[11] 3,914,967

[45] Oct. 28, 1975

[54] STEERING-LOCKING ANTITHEFT DEVICE FOR MOTOR VEHICLES

[76] Inventor: Dario Arman, Via Venaria, 13/15, 10040, Druento (Torino), Italy

[22] Filed: June 20, 1974

[21] Appl. No.: 481,287

[52] U.S. Cl. .................... 70/252; 70/186; 200/44
[51] Int. Cl.² ........................................ B60R 25/02
[58] Field of Search ........................ 70/252; 200/44

[56] References Cited
UNITED STATES PATENTS
2,203,949  6/1940  Edwards .............................. 70/252
3,840,714  10/1974  Arman ................................. 200/44

Primary Examiner—Albert G. Craig, Jr.
Attorney, Agent, or Firm—Alan H. Levine

[57] ABSTRACT

An automotive antitheft device of the type mounted on the vehicle steering housing and having a lock cylinder and a latch adapted to engage a recess in the steering column. When the key is removed from its seat in the lock cylinder, one end of a rocking lever interferes with the key seat and the other end of the lever contacts a cylindrical member freely movable between a fixed shoulder and a plate slidable parallel to the latch. The cylindrical member cooperates with a stop on the back of the latch to lock the latter when it is retracted. A shaft rotates with the lock cylinder and carries a projection for locking the latch in its retracted position. An electrical switch has a rotor rotatable by the key. The rotor has radial pushers acting on basculating contacts, each of the latter cooperating with a pair of contact tablets connected to the motor vehicle electrical system.

7 Claims, 22 Drawing Figures

STEERING-LOCKING ANTITHEFT DEVICE FOR MOTOR VEHICLES

The present invention relates to antitheft devices for motor vehicles, which lock the steering column by means of a latch.

It is known that the motion of rotation imposed on the key, in these devices, defines the position of the latch and actuates an electrical switch which controls the motor vehicle system.

The subject matter of the present invention is an improvement relating to the mechanical and the electrical members of steering column locking antitheft devices for motor vehicles. The improvement is substantially characterized in that, relative to the mechanical structure of the device, the latch when brought to the retracted position, is locked by a stop cooperating with an intermediate member which is kept in said locking position by one of the ends of a rocking lever which in turn is constrained in said position by the presence of the key within the lock cylinder. Said locking position is held until the key is completely extracted, that is, through its whole length, from the corresponding axial seat of the cylinder.

Another particular feature of the device resides in that, when the latch is in its retracted position, a terminal stop integral with a shaft and rotating together with the lock cylinder, interferes and locks the outlet seat of the latch and prevents the starting manoeuvre if the latch has not been retracted.

Concerning the electrical switch, as a part of the device and according to the improvement of the invention, the switch is characterized in that it is provided with a plurality of lamellar basculating and sliding electrical contacts. Said lamellar contacts being crown arranged with respect to a static support and cooperating with fixed tablets electrically connected to the utilization circuit. The position of said basculating contacts, with respect to the fixed tablets, being determined by a corresponding plurality of pushing members radially carried by the switch rotor; the angular positions of the rotor being directly determined by the angular positions imposed on the key.

Other particular features of the improvements according to the invention will be seen from the following specification which refers to the accompanying drawings which are illustrative of the invention and wherein.

With reference to the electrical switch.

With reference to the drawing, the device comprises an external tubular casing 25 to be inserted in a corresponding seat A, provided in the motor vehicle, and located in an inclined and almost radial position with respect to the tubular element B which coaxially contains the steering column C wherein the known seat D, adapted to be engaged by the end of latch 26, is formed.

Said casing 25 is provided with end 27 having a shape suitable to couple, in an oblique position, with the tubular element B by a partial penetration in the seat b formed in the same.

Figures 3, 4:
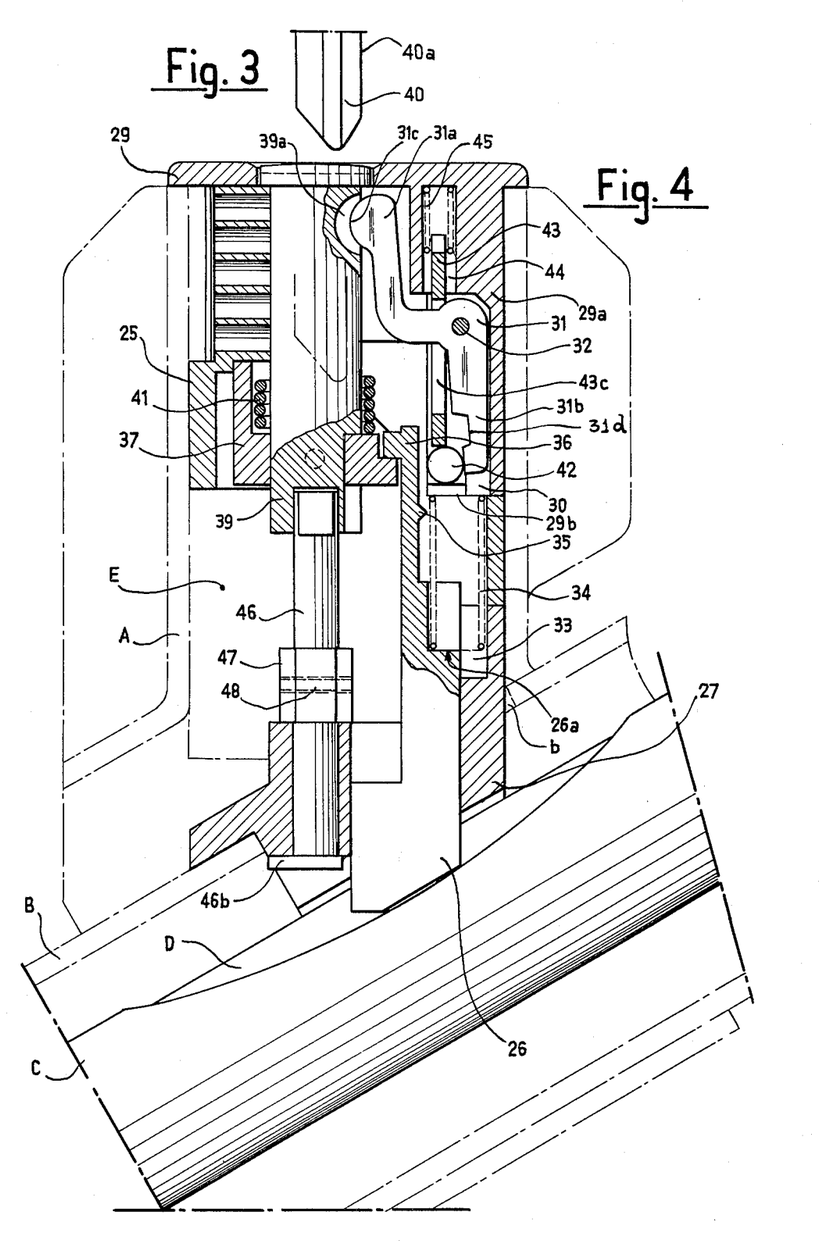
FIG. 3 shows the end of the key, the manoeuver ear thereof being omitted.
FIG. 4 is a longitudinal cross-section of the device, along line IV—IV of FIG. 2.
Figures 5, 6, 7:
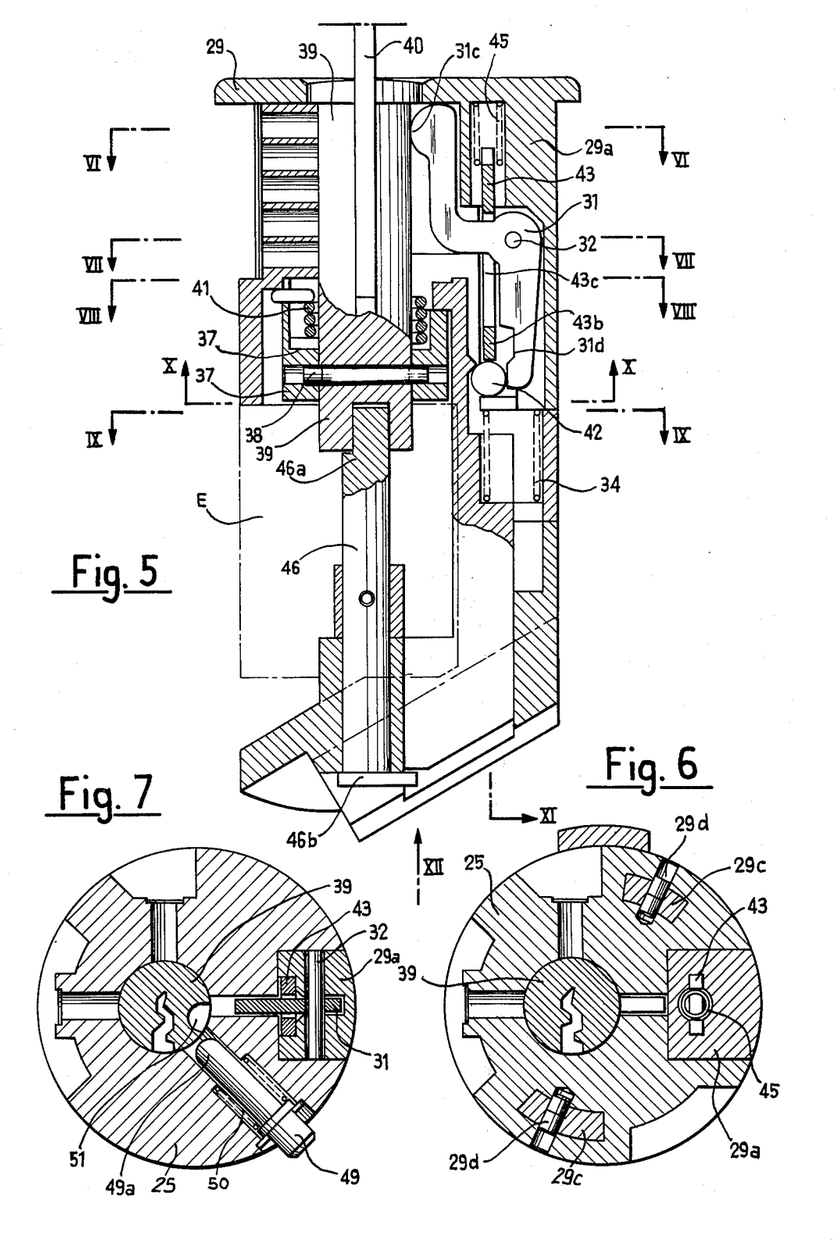
FIG. 5, similar to FIG. 4, shows the device wherein, with the key inserted in the cylinder, the kinematic members have assumed positions which are different from those shown in FIG. 4.
FIG. 6 is a cross-sectional view of the assembly, along line VI—VI of FIG. 5.
FIG. 7, similar to the preceding figure shows a cross-section along line VII—VII of FIG. 5.
Figures 8, 9, 10, 11, 12:
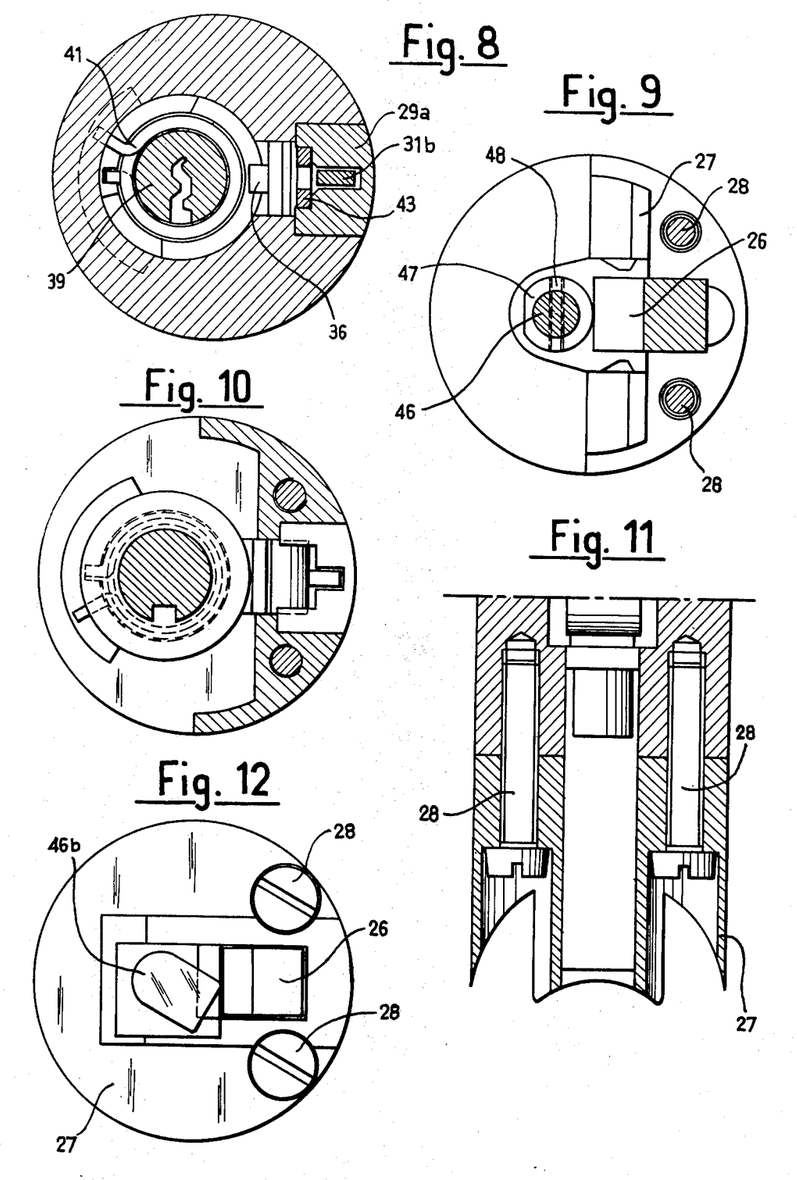
FIG. 8, similar to the preceding figure, is a crosssectional view along line VIII—VIII of FIG. 5.
FIG. 9 is a cross-sectional view along line IX—IX of FIG. 5.
FIG. 10 is a cross-sectional view along line X—X of FIG. 5.
FIG. 11 is a longitudinal cross-section along line XI of FIG. 5.
FIG. 12 is a plan view of the assembly in the direction of arrow XII of FIG. 5.

In FIG. 4 and FIG. 5 only the mechanical members of the device are shown, since for the sake of clarity there is not shown the electrical switch which is housed in the cavity E. The mechanical members form two groups which are coupled in a longitudinal direction and reciprocally engaged by screws 28 (FIG. 11).

A first group of mechanical members comprises the front cap 29 integral with the longitudinal extension 29a. The latter is provided with a fork-shaped seat 30 wherein the lever 31 is pivoted and may oscillate around pivot 32.

Within cavity 33, a spring 34 is housed having one of its ends seated against the fixed shoulder 29b formed by the end of projection 29a, while the other end of the spring seats against the step 26a formed in the body of latch 26; therefore, spring 34 tends to push the latch 26 and drive it into its active position, i.e., into the locking position shown in FIG. 4.

The tang of latch 26 is provided with a projection 35, having a substantially inverted V shaped outline, and a tooth 36 engaged by the dragging cam 37. The latter is integrally mounted with a pin 38, on the end of cylinder 39 which may be rotatingly actuated by means of key 40.

The spring 41, mounted on the skirt of cylinder 39 reacts elastically to the angular movement of the key when the latter is rotated, from its "RUN" position to the "START" position, and returns the rotating assembly together with the rotor of the electrical switch, as later described, to the "RUN" position when the key is released.

When the key 40 is extracted, in correspondence of the "STOP" position, from its seat formed in the cylinder 39, it leaves the latter in such a radial position as to present the cavity 39a, having a half-moon profile, conforming with the semi-circular end 31a of lever 31 which enters the cavity and interferes with the seat of the key.

Figures 1, 2:
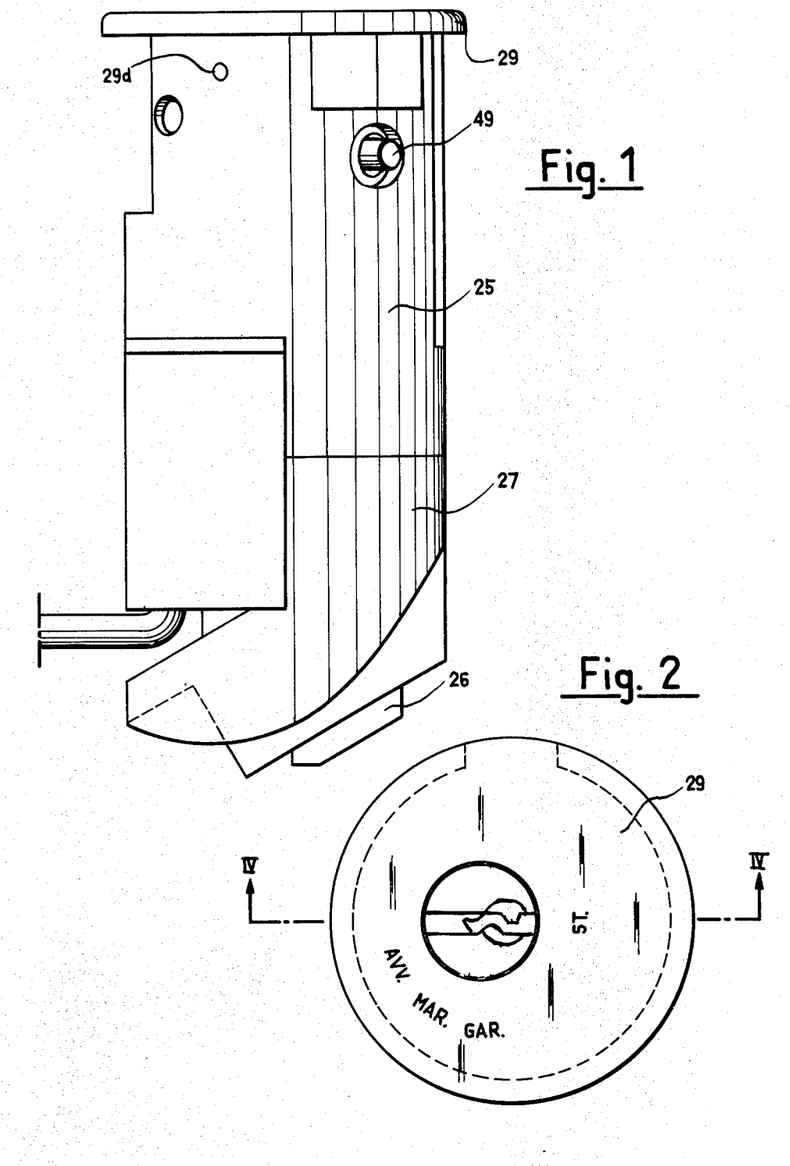
FIG. 1 is an elevational view of the device according to the invention, as seen from the exterior.
FIG. 2 is a front view of the same.

In the locking position of the latch 26, shown in FIG. 1, end 31b of lever 31 abuts a cylindrical member 42 mounted for free movement between end 31b, the end 43b of plate 43, and the projection 35 is presented by the latch 26.

The plate 43 is mounted for sliding movement in a longitudinal direction within the seat 44 and is subjected to the thrust of spring 45, said plate being further provided with a wide transverse slot 43c, the square-bent branch of lever 31 passes through said slot.

The shaft 46 is a part of a second group of mechanical members, and with its suitably profiled end 46a it engages, by a coupling, a corresponding front seat formed in the inner end of cylinder 39. As a result, shaft 46 is thereby rotatable together with the cylinder and within the corresponding seat formed in the part 27, crossed by the latch 26 parallel to said shaft 46; 47 indicates a retaining bush for shaft 46 and 48 indicates a diametric pin to fix said bush. The end 46b of shaft 46 is flat and eccentric with respect to the same shaft and therefore it can assume the different positions represented in FIGS. 5 and 4, which are, respectively, a locking and an unlocking position for the latch 26.

49 (FIGS. 1 and 7) indicates a radial pin arranged for axial movements within a corresponding seat formed in the casing 25; said pin, under the influence of spring 50 tends to maintain the position represented on FIG. 7, that is, a position of longitudinal and transverse engagement between said casing 25 and the tubular seat A which contains it. The cavity 51, radially formed in the cylinder 39 is capable of receiving the end 49a of pin 49 when the cylinder 39 is rotated through a suitable angle by means of the key 40.

With reference to FIGS. 14 to 21, the electrical switch is structurally formed by a hollow stator 52, made of molded electrically insulating material within which the contact-carrier member 53 is mounted. Due to the profile of member 53, it cannot rotate relative to the stator 52 but it may only make an axially sliding movement of a predetermined amplitude with respect to the same. Member 53 is provided with a hollow seat 53a whose bottom presents two inclined and symmetrical planes (diametrically opposite each other). Within said hollow seat 53a the frontal projections 54a of rotor 54 work; both the member 53 and the rotor 54 are also made of molded electrically insulating material. Three or more springs 55 are mounted within corresponding frontal seats formed in member 53 and seat against cap 56 of the stator, and thereby they tend to maintain the member 53 in the position represented in FIG. 21.

In the case represented in the drawings, two electrical terminals 57, 58 (FIGS. 15, 21) are connected to electric cables 57a, 58a which are in turn connected to the electrical power source of the motor vehicle; a second order of electrical terminals 59, 60, 61, 62 (FIGS. 19, 20) are connected to corresponding distribution electrical cables correspondingly indicated at 59a, 60a, 61a, 62a. As clearly represented in FIG. 16, the electrical terminal 57 is made in a single body with blade 57b carrying three separate electrical contact tablets arranged in radial positions, relative to the switch axis; the electrical terminal 58 is integral with blade 58b which carries a single contact tablet. Terminals 59 to 62 each carry electrical contact tablets in longitudinal alignment with the four electrical contact tablets carried by terminals 57 and 58.

Lamellar mobile members 64 are mounted for basculating movements, by the engagement of their tabs 64a within cavities 53a, between the above said four orders of contact tablets which, considered in pairs, are longitudinally aligned and form two orders located at different heights within the stator. Each basculating contact 64 is subjected to the thrust of a spring 65, located in a radial seat formed in member 53 and further, to the action of a pusher element 66 slidably mounted in a corresponding radial seat of member 53. Each pusher 66 is actuable by the angular movement of rotor 54. Substantially, said rotor 54 is provided with four circumferential grooves 54b, having a predetermined angular amplitude, one for each pusher 66; the ends of each groove 54b are profiled as inclined planes merging with the cylindrical skirt of the rotor.

The anngular movement imposed on the rotor pushes each pusher 66 radially inwardly when the corresponding groove no longer contains the base of that pusher which comes in contact with the nongrooved skirt of the rotor cylinder, while the springs 65, reacting on the corresponding basculating contact 64, provide for the determination of the opposed sliding radial movement of pushers 66, that is, in a direction converging towards the rotor axis, when the corresponding groove 54b appears again under each of them.

Figures 13, 14, 15, 16, 17:
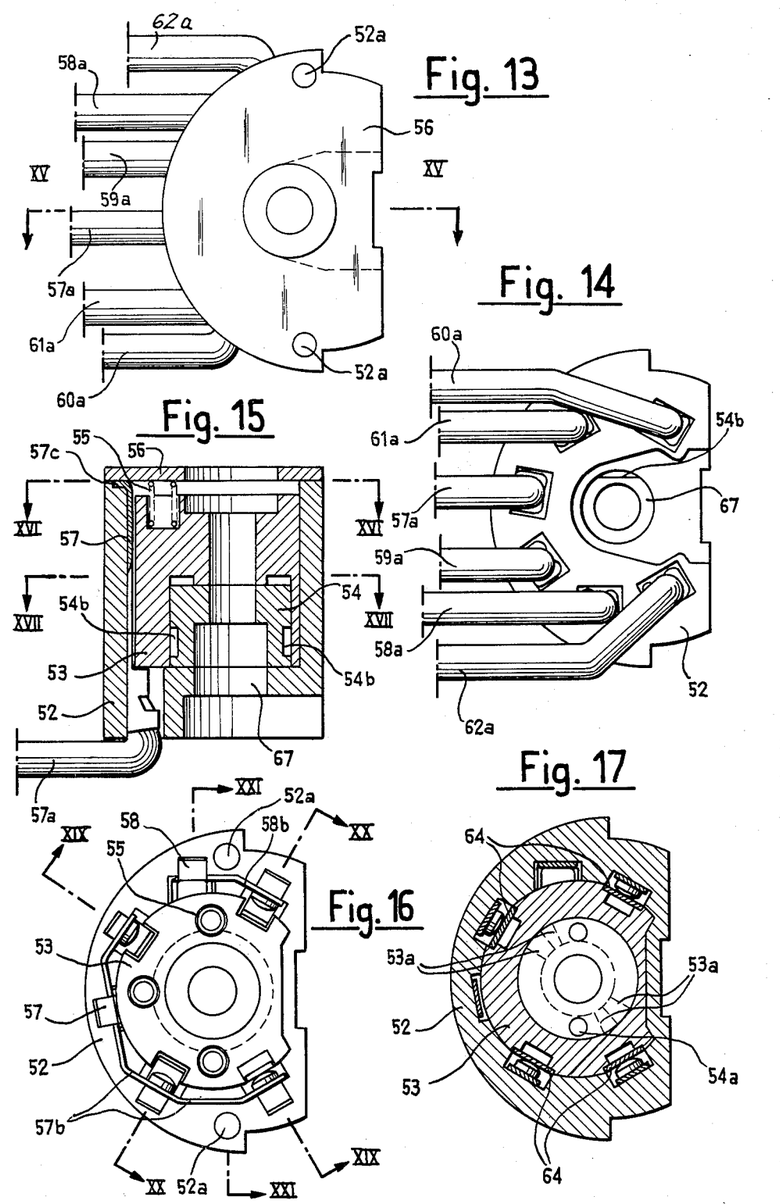
FIG. 13 is a plan view of the switch.
FIG. 14 is a view of same, turned through 180° with respect to the preceding figure.
FIG. 15 is a longitudinal cross-sectional view thereof along line XV—XV of FIG. 13.
FIG. 16 is a cross-sectional view of same along line XVI—XVI of FIG. 15.
FIG. 17 is a cross-sectional view of the electrical switch, along line XVII—XVII of FIG. 15.
Figures 18, 19, 20, 21, 22:
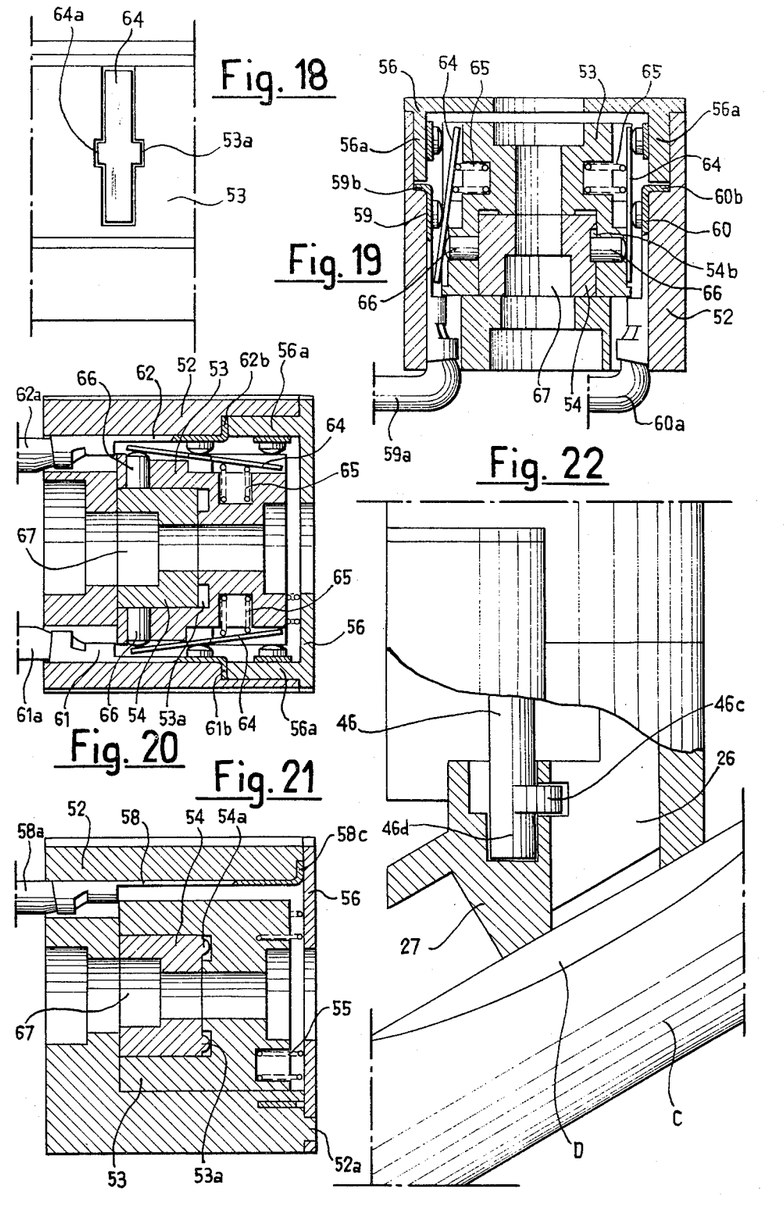
FIG. 18 is a plan view of one of the basculating electrical contacts.
FIG. 19 is a longitudinal cross-section of the switch, along line XIX—XIC of XIX 16.
FIG. 20 is a longitudinal cross-sectional view thereof, along line XX—XX of FIG. 16.
FIG. 21 is a further longitudinal section view of same along line XXI—XXI of FIG. 16.
FIG. 22 shows a possible variant of the safety means providing the locking of the latch when it is in the retracted position.

As represented in FIGS. 15 and 21, the electric terminals 57, 58 are provided with retaining bent ends 57c, 58c, which are clamped by the bottom element 56, in corresponding cavities formed on the edge of stator 52.

As shown in FIGS. 19 and 20, the electrical terminals 59, 60, 61, 62, are provided with analogous retaining ends 59b, 60b, 61b, 62b, which are clamped in suitable seats of stator 52, at different heights relative to the preceding, by projections 56a of the bottom element 56.

Stating in advance that seat 67 (FIGS. 15, 19, 20, 21) of rotor 54, having a transverse section substantially circular and cut by a plane 54b (FIG. 14) parallel to the axis of the rotor, accommodates by coupling the bush 47 (FIG. 4) which has the same profile and is integral with shaft 46, coaxially inserted with respect to the cylinder 39, when the electric switch is mounted within cavity E, the operation of the device is the following:

the key 40 may be extracted from the corresponding seat of the cylinder of lock 39, only if brought to the STOP or to the GARAGE angular position; for both said positions, the electrical circuit of the motor vehicle is inactive because the basculating contacts 64, which are in correspondence with tablets 57, 58 connected to cables 57a, 58a driving the electrical current, are open resulting therefore in the position shown in FIG. 20. In these conditions, the mechanical members of the assembly result in the position shown in FIG. 4, if the key is extracted when in the position "STOP;" in said position, the latch 26 pushed by spring 34, engages the cavity D formed in the steering column and locks any possible rotation of same.

By inserting the key 40 in the cylinder 39 (FIG. 4) the side 40a of the key meets the arcuated profile 31c of the rocking lever 31 and obliges it to oscillate around the axis of pin 32; the end of branch 31b of said lever presses on the skirt of cylinder 42 driving it in contact with the back of latch 26; when the whole length of the key 40 has been inserted, the cylinder 39 is released and free to rotate. The angular movement imposed on the key 40 and the cylinder 39 is transmitted to the collar 37 which engages, with its cam profile, the tooth 36 of latch 26.

The angular movement of collar 37 imposes on the latch 26 a retracting longitudinal movement in the direction of arrow XII in FIG. 5, overcoming the reaction of spring 34. Shaft 46 rotates together with collar 37 and, when the latch 26 is completely withdrawn (FIG. 5), shaft 46 drives its stop snug 46b to lock the latch in the safety position. At the same time, the projection 35 with an inverted V profile, carried by the back of latch 26, has engaged the cylinder 42 and pushed it constantly in the direction of arrow XII, until it has carried it within cavity 31d of lever 31; when it has reached this position, the cylinder 42 falls again beyond the projection 35 to the position shown in FIG. 5. The movement of the cylinder 42 also forces the plate 43 to slide and return to the position shown on FIG. 5, due to the elastic reaction of spring 45.

The angular movement of the key has therefore covered an arc of about 90°, from position STOP to the position GARAGE, FIG. 2, and may be extracted from its seat.

Continuing the rotation of key 40 and passing through the RUN position, the key reaches the START position; during this second angular displacement, when the key reaches the RUN position, the rotor 54 of the electric switch, rotates through the same angle as shaft 46, while some of the pushers 66 remain active. one pair of pusher elements 66 (only one of them being visible in FIG. 19) becomes inactive because it reaches the bottom of the corresponding seat 54b; the spring 65 pushed the corresponding basculating contact 64; each basculating contact 64 establishes and closes some of the electrical circuits of all the motor vehicle services, except the electrical feeding of the starting motor.

During the displacement from the RUN position to the START position, the torsion spring 41 is charged and at the same time all the pushers 66 previously active become inactive, while the reaction of the corresponding springs 65 closes the remaining basculating contacts 64 and the electrical circuit feeding the start motor. Further, the angular movement of the rotor 54 causes the longitudinal projections 54a (FIG. 2) to slide in the corresponding grooves 53a which have an inclined bottom (FIG. 17), the part 53 which is slidably mounted but not rotatable in the stator 52, overcoming the reaction of springs 55, experiences a longitudinal sliding movement, of a limited and pre-established amplitude, together with the basculating contacts 64. In this phase, all the basculating contacts 64 are closed against the corresponding silver-plated electric contact tablets, and therefore there is a wiping between the metal contacts which assures the automatic cleaning of same.

When the key is released from the START position, the spring 41 (FIGS. 4 and 5) returns the entire electric switch to the RUN position, and therefore, the electric feeding to the starting motor ceases. At the same time, the basculating contacts which are all in the closed position, are submitted to a further reciprocal wiping determined by the return movement of part 53 to the initial position, due to the automatic counter-rotation of the key and the part 53 and to the reaction of springs 55 which are no longer compressed.

With reference to FIGS. 13, 14, 21, 52a indicates shanks integral with the stator 52 and inserted in corresponding seats provided in the bottom 56 of the switch casing and riveted therein.

With reference to FIG. 22 and according to one of the possible variants, the shaft 46 instead of being provided with a frontal projection 46b is provided with a radial projection 46c and a terminal pin 46d which may rotate within a corresponding seat formed in a projection of the casing 27; the latch 26, instead of being clamped frontally, is clamped by said projection 46c which engages the cavity 26d when the latch is in the retracted position.

The external structure of the device and some details of same may be varied. With a particular reference to FIGS. 1 and 6, wherein 29d indicates radial pins engaging projections 29c of the frontal cap 29 with respect to the body 25, it is evident that said structure may be different, while keeping unchanged the fundamental features of the invention.

What is claimed is:

1. A antitheft device for a motor vehicle having a fixed steering column containing a rotatable steering shaft, said column having an opening in its side and said steering shaft having a cavity registerable with said opening, said device comprising:
   a. a tubular casing fixed to said steering column and aligned with the opening therein,
   b. a latch within said casing and slidable with respect thereto toward and away from the steering shaft, said latch being extendable into the cavity to lock the steering shaft against rotation and retractable out of the cavity to permit rotation of the steering shaft, a stop projecting laterally from said latch;
   c. resilient means urging said latch toward the steering shaft.
   d. a lock mechanism rotatably arranged within said casing, said mechanism having at least two different angular positions of adjustment,
   e. a cam rotatable with said lock mechanism and having a surface inclined with respect to the longitudinal axis of said casing, a follower fixed with respect to said latch and engageable with said cam surface, said cam and follower maintaining said latch in a retracted condition when said lock mechanism is in a first position of adjustment and permitting extension of said latch into the cavity when said lock mechanism is in a second position of adjustment,
   f. a roller adjacent to said latch and resting upon a shoulder fixed with respect to said casing, said shoulder facing away from the steering shaft, and
   g. a lever within said casing and pivotable about an axis transverse to the longitudinal axis of said casing, said lever being responsive to the presence of a key in said lock for pushing said roller toward said latch and into the path of movement of said stop as said latch moves to its retracted position, bypass means to allow said stop to pass said roller during this movement, said roller becoming wedged between said stop, said shoulder, and said lever to maintain said latch in its retracted position unless said lock is rotated to one particular position and the key removed.

2. An antitheft device as defined in claim 1 including spring means urging said roller against said shoulder, said spring means also urging said lever in a direction such that one of its ends moves away from said roller and the other of its ends moves into the path of movement of a key into said lock mechanism.

3. An antitheft device as defined in claim 2 including a plate interposed between said spring means and each of said roller and lever, said plate being slidable parallel to the direction of movement of said latch.

4. An antitheft device as defined in claim 3 including a slot in said plate through which one arm of said lever extends.

5. An antitheft device as defined in claim 1 wherein one of the ends of said lever is adjacent to said roller, and said bypass means includes a cavity in said lever near said one end, said cavity accommodating said roller when it is lifted away from said shoulder by said stop upon movement of said latch to its retracted position, said roller dropping between said stop and shoulder when said latch reaches its retracted position.

6. An antitheft device as defined in claim 1 including an electrical switch having a rotor rotatable with said lock mechanism, basculating contacts each of which is cooperable with two contact tablets stationary with respect to said casing, each of said tablets being connected to a cable of the motor vehicle electrical system, resilient means urging each basculating contact toward both its respective tablets to complete a circuit, and pushers extending radially from said rotor for pivoting each of said basculating contacts away from at least one of its contact tablets when said lock mechanism is in at least one of its positions of adjustment.

7. An antitheft device as defined in claim 6 including a member rotatable with but slidable axially with respect to said rotor, said basculating contacts being arranged between said member and said contact tablets, and means for moving said member axially in response to rotation of said rotor so as to wipe said basculating contacts against said contact tablets.

* * * * *